US006784869B1

(12) United States Patent
Clark et al.

(10) Patent No.: US 6,784,869 B1
(45) Date of Patent: Aug. 31, 2004

(54) CURSOR AND DISPLAY MANAGEMENT SYSTEM FOR MULTI-FUNCTION CONTROL AND DISPLAY SYSTEM

(75) Inventors: Samuel T. Clark, Federal Way, WA (US); Rolf J. Braune, Redmond, WA (US)

(73) Assignee: The Boeing Company, Chicago, IL (US)

( * ) Notice: Subject to any disclaimer, the term of this patent is extended or adjusted under 35 U.S.C. 154(b) by 118 days.

(21) Appl. No.: 09/713,812

(22) Filed: Nov. 15, 2000

(51) Int. Cl.[7] .............................. G09G 5/00; G09G 5/08
(52) U.S. Cl. ........................ 345/156; 345/157; 345/160; 345/173; 345/810; 345/845
(58) Field of Search ................................ 345/156–157, 345/160–163, 173, 841, 845, 808, 810, 813, 818

(56) References Cited

U.S. PATENT DOCUMENTS 5,956,019 A * 9/1999 Bang et al. ................. 345/173

6,373,472 B1 * 4/2002 Palalau et al. .............. 211/104

* cited by examiner

*Primary Examiner*—Richard Hjerpe
*Assistant Examiner*—Duc Q. Dinh
(74) *Attorney, Agent, or Firm*—Harness Dickey & Pierce P.L.C.

(57) ABSTRACT

A cursor control display and management system for a flight deck of an aircraft for enabling one of a plurality of multi-function displays to be selected and used without the need to physically select controls from a separate panel. The system includes a pair of cursor control devices (CCDs) each having a cursor movement mechanism, a menu select switch, a function select switch and, depending on the specific embodiment, a group of display selector switches. The display selector switches are used to select the CCD cursor to specific displays for use from each CCD. Once a specific display has been selected, the CCD's cursor can be placed over a function on the selected display and the function select switch pressed to select a specific function. A standard or unique pop-up menu or control panel can be displayed on the selected display by pressing the menu select switch on the CCD.

8 Claims, 5 Drawing Sheets

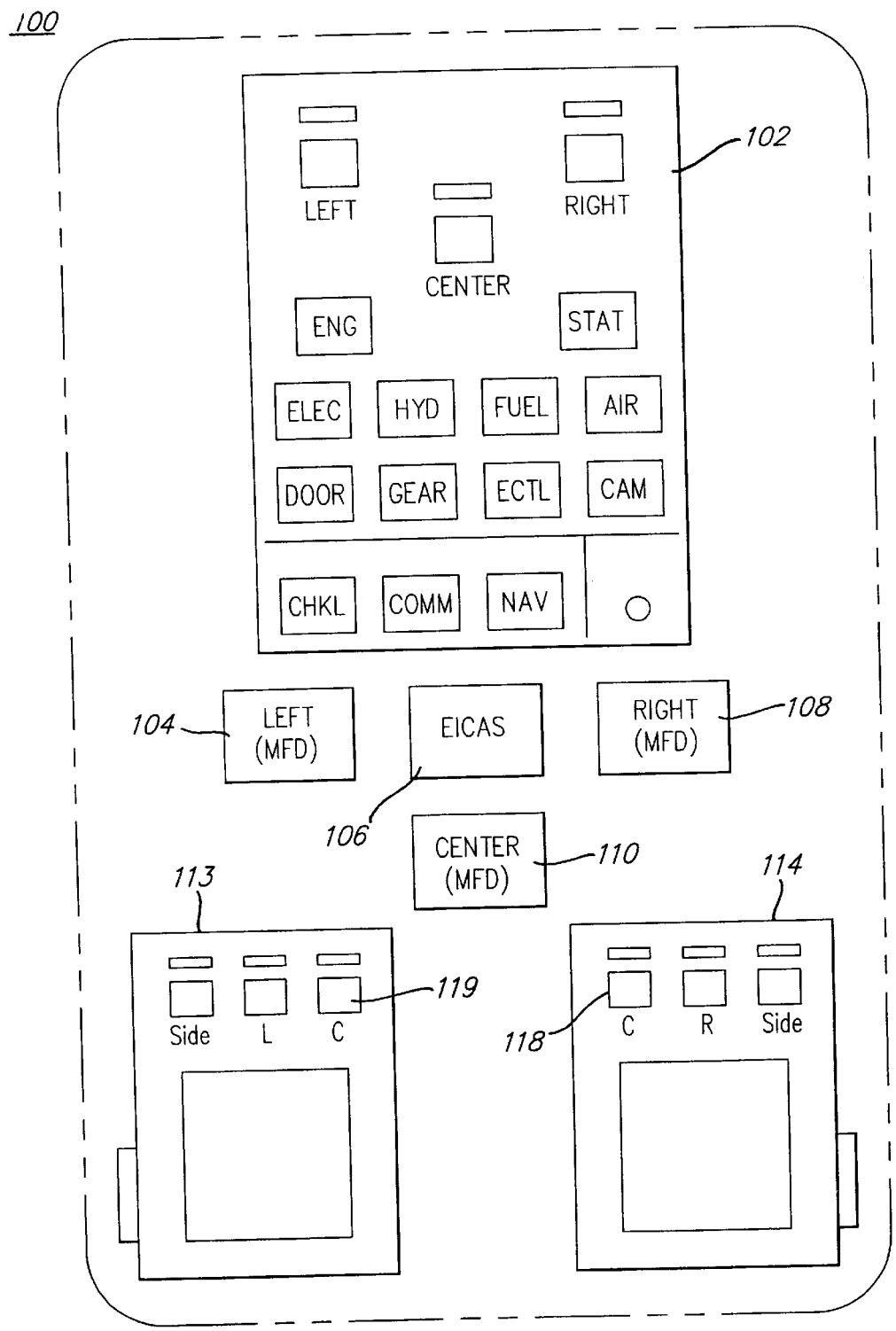
Prior Art
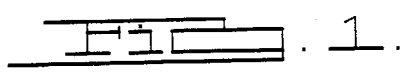

CURSOR AND DISPLAY MANAGEMENT SYSTEM FOR MULTI-FUNCTION CONTROL AND DISPLAY SYSTEM

TECHNICAL FIELD

The present invention relates generally to systems for multi-function control and display, and more particularly to a display based cursor system for implementing fully coupled display and cursor selection of a plurality of interactive and non-interactive displays of an aircraft flight deck.

BACKGROUND OF THE INVENTION

The increasing trend on aircraft flight decks has been towards the use of more complex and numerous display and cursor based interactive functions. The display environments within various vehicles such as commercial and military aircraft will likely become even more display intensive in the following years. On present day flight decks, multiple functions (e.g. Electronic Checklist, Data Link, Navigation, FMC interface, Airframe System interfaces, Engine displays, Status displays, etc) can be displayed on multiple displays. The trend toward greater numbers of displays is almost certain because the use of dedicated control panels is limited by space constraints and cost considerations.

In general, the potential for operator display misselections, unintended/inadvertent input errors, and increased workload are associated with multiple display activity. It is believed that the root cause of such problems is associated with display and cursor management designs which are sometimes problematic for pilot(s) to operate, require multiple reaching motions by the pilot(s) to select the proper display, and which can occasionally lead to difficulty in managing the selection and/or use of shared and dedicated displays.

There are currently only two interactive functions in use on the Boeing 777 aircraft: the Electronic Checklist (ECL) function and the Comm Management (COMM) function. The remaining functions are non-interactive information interacts such as the system synoptic and the secondary engine instruments page. The interactive ECL and COMM functions are seldom, if ever, used concurrently by the same pilot. When pilot activity is limited to one pilot and a single display, the errors reported and investigated are truly rare. However, even today, when multiple displays are called into concurrent use by the same pilot or both pilots, there is always at least a small chance for inadvertently selecting or deselecting an unintended display or function. More significantly, when the current multi-function display design is employed in a highly display intensive environment where more shared and dedicated displays and more interactive functions exist, the additional workload that results for the pilots, as well as the risk of misselections by the pilots, increases significantly.

As shown in FIG. 1, the Boeing 777 aircraft has three multifunction 8"×8" (20.32 cm×20.32 cm) displays, which are respectively Left 104, Center 110, and Right 108. A single glare shield located 5"×5" (12.7 cm×12.7 cm) display select panel (DSP) 102 is shared by both pilots and allows selection of the three multifunction displays. Display selection is mutually exclusive; only one display at a time can be selected. The desired one of several functions (e.g., Electronic Checklist, Data Link, Navigation display, Airframe system synoptic, Engine display, Status display, etc.) can then be selected to that display. Of the three multifunction displays, the Left 104 is currently dedicated exclusively to the left seat pilot, the Right 108 is currently dedicated exclusively to the right seat pilot, and the Center 110 is shared by the two pilots. A second center display 106 is dedicated to EICAS. Interface with these displays is via two 3"×5" (7.62 cm×12.7 cm) cursor control devices (CCDs) 113, 114 located on the center aisle stand. The left CCD 113 is dedicated to the left seat pilot and the right CCD 114 is dedicated to the right seat pilot. Switches 119 on the left CCD 113 allow the left cursor to be moved between the Left and Center multifunction displays 104, 110 without affecting the display selected on the DSP 102. Likewise, switches 118 on the right CCD 114 allow the right cursor to be moved between the Right and Center multifunction displays 108, 110 without affecting the display selected on the DSP 102.

Two types of system operating errors which have been noted are display misselection and input errors. Display misselections arise primarily because a user's cursor can be active on one display while a different display is selected on the DSP. Users then subsequently attempt to deselect or select a function and that function deselection or selection ends up unexpectedly on a display other than the display they are using—often displacing some other function. The user then has to recover both the unintended displaced function and the originally intended deselection or selection. In a high workload situation this can be extremely disruptive. Display misselections can arise whenever two or more displays are in concurrent use. The strategy used by pilots who generally manage to minimize such errors is to manually couple their cursor and display selection. At either the beginning or end of their interaction with a display, these pilots first select the display they are using on the DSP. While this manual coupling eliminates many of the potential display misselections, the cost is high in terms of added physical and cognitive workload. Display misselections can still occur when, under high workload, the pilot forgets to manually select the intended display before selecting or deselecting a function.

Input errors and increased workload arise primarily because of the shared display select panel (DSP). Because both pilots use the DSP, the DSP cannot tell which pilot is making DSP selections. In the case of the left multi-function display which is currently dedicated to the left seat pilot, and in the case of the right multifunction display which is currently dedicated exclusively to the right seat pilot, when these displays are selected the appropriate cursor (Left or Right) can be automatically placed on the display. This is known as "determinant" display and cursor coupling. However, in the case of the shared center display, the appropriate cursor is "indeterminate" because it is not known which pilot (left or right) is selecting from the shared DSP. The current Boeing 777 design is such that if one of the cursors (Left or Right) is active on one of the dedicated multifunction displays (Left or Right), then the opposite cursor will be automatically placed on the center display when an interactive function is selected to the center display. If neither one of the cursors (Left or Right) is active on one of the dedicated multifunction displays (L or R), then the last cursor that was active on the center display will be automatically placed on the center display when an interactive function is selected to the center display. This cursor coupling to the shared center display is appropriate only if the other pilot or last center display user is selecting the center display. This design is predicated on the assumption that the same user will not be interacting with two or more displays concurrently. It should be noted that this is an optimal design, given the current Boeing 777 design which has only two interactive functions, those being ECL and COMM, which are not generally used concurrently by the same pilot.

Input error problems occur when multiple displays are used concurrently. If the same user selects the shared display while their cursor is active on their dedicated display, the opposite cursor is automatically coupled to the shared display selection. In workload intensive environments or situations it is possible that this might cause confusion and/or frustration because previously, whenever the shared display is the only or first display a user has selected, his cursor has been coupled to that selection. In the case where the shared display is selected while the dedicated display is in use, user attempts to make an input on the shared display actually result in input actions on the dedicated display where their cursor remains. Users who avoid input errors invariably adopt the strategy of always selecting their cursor to the display of their focus. In effect, these users manually couple their cursor to their display selection. In summary then, manually selecting the intended display before selecting or deselecting a function eliminates display misselection and manually selecting the user's cursor to the intended display before input eliminates input errors. However, both of these manual strategies are workload intensive and pilots often forget to do so under stress, when pressed for time, or when workload is high.

It is, therefore, a principal object of the present invention to provide a multifunction control and display management system for a flight deck of an aircraft, which virtually eliminates the possibility of pilot error in selecting desired displays or functions from one of a plurality of multifunction displays, as well as further reducing the potential for input errors by the pilot(s).

SUMMARY OF THE INVENTION

The above objects are provided by a multifunction control and display system incorporating improved cursor and display management. The invention eliminates or ameliorates display misselections, unintended/inadvertent control errors, and workload associated with multiple display activity, on a flight deck of an aircraft or in any location or application involving the use of multiple displays and functions.

In a first aspect of the invention, a plurality of displays and at least two cursor control devices are provided to display both interactive functions, non-interactive functions and a cursor. Each cursor control device (CCD) has a menu select switch on the CCD and a function control thumb-switch. In this aspect of the invention, the conventional display select panel (DSP) and the cursor select buttons on the CCD are not used. Instead, the cursor is moved from one display to another by simply pushing the cursor against a display edge leading to an adjacent display. The cursor is displayed full time in interactive functions, non-interactive functions, and on blank displays. Interactive and non-interactive functions are selected from a menu which appears on the display the cursor is on when the CCD menu select switch is pressed or when the cursor is placed in an inactive (e.g., unhighlighted) display area and the CCD thumb-switch is pressed. On certain displays or display formats, the menu which appears may actually be a control panel which allows interactive control of aircraft systems, components or interfaces. Alternatively, the menu which appears may allow selection and display of mini control panels which appear concurrent with the existing display format, that is, overlay only a part of the display format that was displayed prior to selection of the control panel. This allows the concurrent use of two or more functions (any of which may be interactive or non-interactive) on the same display.

In this "single display surface" aspect of the invention, the cursor may be moved freely between displays. In other cases, however, software may be employed to allow cursor operation at the edge of a display without unintended cursor movement between displays. For example, once the cursor reaches the edge of a display, additional time, force or other input may be required before the cursor transitions to the adjacent display. Alternatively, the user may be required to remove input to the cursor movement device or to operate the cursor movement device in a particular manner. For example, once the cursor is near or reaches the display edge, the user may be required to select the CCD thumbswitch to move the cursor to the next display, or untouch the CCD touch screen before a touch screen input causes the cursor to transition to an adjacent display. Alternatively, a certain rate of cursor travel may be required before the cursor transitions to an adjacent display. Still further, once the cursor reaches the display edge, the user's finger could be required to travel a certain distance or at a certain rate on the CCD touchscreen before the cursor would transition to an adjacent display. Regardless of the specific means employed, the preferred embodiments reliably assure that movement of the cursor between displays is intentional and not accidental.

In an alternative embodiment of the invention, the cursor may move freely throughout 100% of the surface area of each display. As the cursor moves into active controllable areas in a display or display function, that active/controllable area may be highlighted in some visual (e.g., intensity, patter, color, flashing, etc.) or aural (e.g., tone, voice, etc.) manner. An alternative case is envisioned where the cursor is limited to the active/controllable areas on each display. In this case, the cursor would appear to "jump" from one active/controllable area to an adjacent active/controllable area both within and between displays. As in transitions between displays, suitable means may be used to reduce or prevent unintentional cursor movement between active/controllable areas.

In another alternative preferred embodiment of the invention, a DSP and a CCD are provided. Multiple displays (e.g., left, upper center, lower center, right, etc) are selected from each user's CCD. Display selection places the CCD cursor on the selected display. Interactive and non-interactive functions are selected from the DSP.

In another preferred embodiment the DSP is eliminated. Interactive and non-interactive functions are selected and deselected from an on-screen menu displayed by selecting the cursor to a display using the CCD buttons corresponding to each display and then pressing a CCD menu select switch. As a result, this configuration reduces part count, increases system reliability, and lowers change cost of the existing multi-function control and display system. It also reduces workload and increases error free management of and interaction with the displays by operators.

The preferred embodiments of the present invention thus reduce the potential operator confusion that might result in workload intensive situations or environments with previously developed multifunction display arrangements. Since cursor and display selection are integrated at each CCD, and since in most cases cursor, display and menu selections are coupled, there is virtually no risk of unintended display selections, deselections or unintended operator inputs.

BRIEF DESCRIPTION OF THE DRAWINGS

The various advantages of the present invention will become apparent to one skilled in the art by reading the following specification and subjoined claims and by referencing the following drawings in which:

FIG. 1 is a simplified illustration of a prior art display system;

DETAILED DESCRIPTION OF THE PREFERRED EMBODIMENTS

Figure 2:
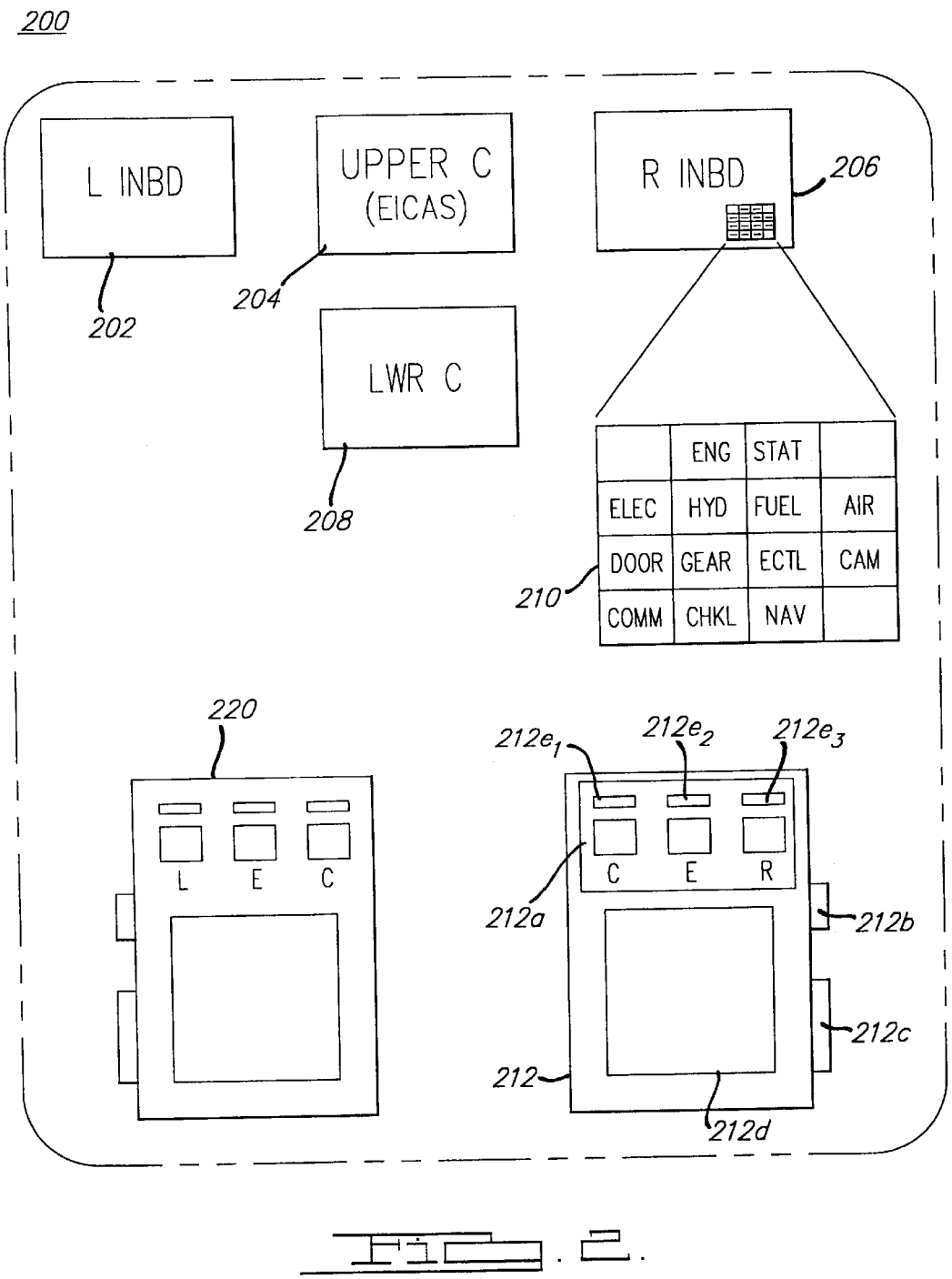
FIG. 2 is a view of the display and cursor management system of the present invention.

Referring to FIG. 2, there is shown a multi-function control and display system 200 in accordance with a preferred embodiment of the present invention. The system 200 incorporates two cursor control devices (CCDs) 212, 220. Right cursor control device 212 is dedicated to a right seated crew member and the other cursor control device 220 is dedicated to a left seated crew member. Additional CCDs can be added as required for additional crewmembers or observers. An upper center multi-function display 204 and a lower center multi-function display 208 are shared displays, while a right multi-function display 206 and a left multi-function display 202 are defined as displays dedicated to the right and left seated crew members, respectively.

Selection of any display is achieved by the operator by simply using his/her CCD 212 or 220 to directly select a desired one of displays 206, 202, 204, or 208. CCD 212 incorporates display select switch panel 212a, a menu select switch 212b, a function select switch 212c, a touch screen 212d, and selected display indicator lights $212e_1$, $212e_2$ and $212e_3$. Referring first to the display select switch panel 212a, buttons "E," "C" and "R" are designated to respectively select displays 204, 208 and 206. Additional switches may be added to select additional or optional displays if incorporated. Pressing any button "E," "C," or "R," of the display select switch panel 212a selects the corresponding display and places the respective CCD cursor directly on the selected display. Cursor positioning logic can be used to position the cursor to different default locations on the selected display based on existing logical circumstances. For example, positioning logic could be employed in software associated with the system 200 to return the cursor of a given CCD to its last occupied location on a display, to center the cursor on a display, or to position the cursor on a control switch or function selection corresponding to a current electronic checklist line item, etc.

The menu select switch 212b is used to bring up a menu, control panel, or other interactive function or area on the selected display. The function select switch 212c is used to select specific menu items or control functions appearing on the menu, control panel, or other interactive area when the cursor is placed on the desired menu item, control function, or interactive area. The touch screen 212d is controlled by suitable software to allow a user to drag his/her finger thereover to control movement of the cursor on whichever display it is selected to. Default cursor positioning logic can be used to facilitate cursor positioning when the display or display function is first selected. Default cursor positioning logic can also be used to facilitate selection and deselection of menu items, control functions, and other interactive areas. For example, depending on the function currently displayed, the default cursor position in the menu may be to the menu item corresponding to the function currently displayed, to a default interactive function or to a center position within the menu being displayed.

The system 200 thus forms a display based cursor centered system instantiating fully coupled display and cursor selection. The cursor is preferably displayed full time in both interactive and non-interactive functions. The cursor may or may not be displayed full time on blank displays. For example, the cursor may return to a default display location or default display when the display is blanked or a non-interactive function is displayed. A principal advantage of the system 200 is that no DSP is required, and therefore there is no requirement of the system 200 to "decide" which cursor to place on a shared display. The elimination of the DSP also means that operators are not required to reach repeatedly to the DSP to select which shared display to place the cursor on. This substantially eliminates the possibility of the operator misselecting a display or making an erroneous or unintended input associated with a given display or display function.

Figure 2A:
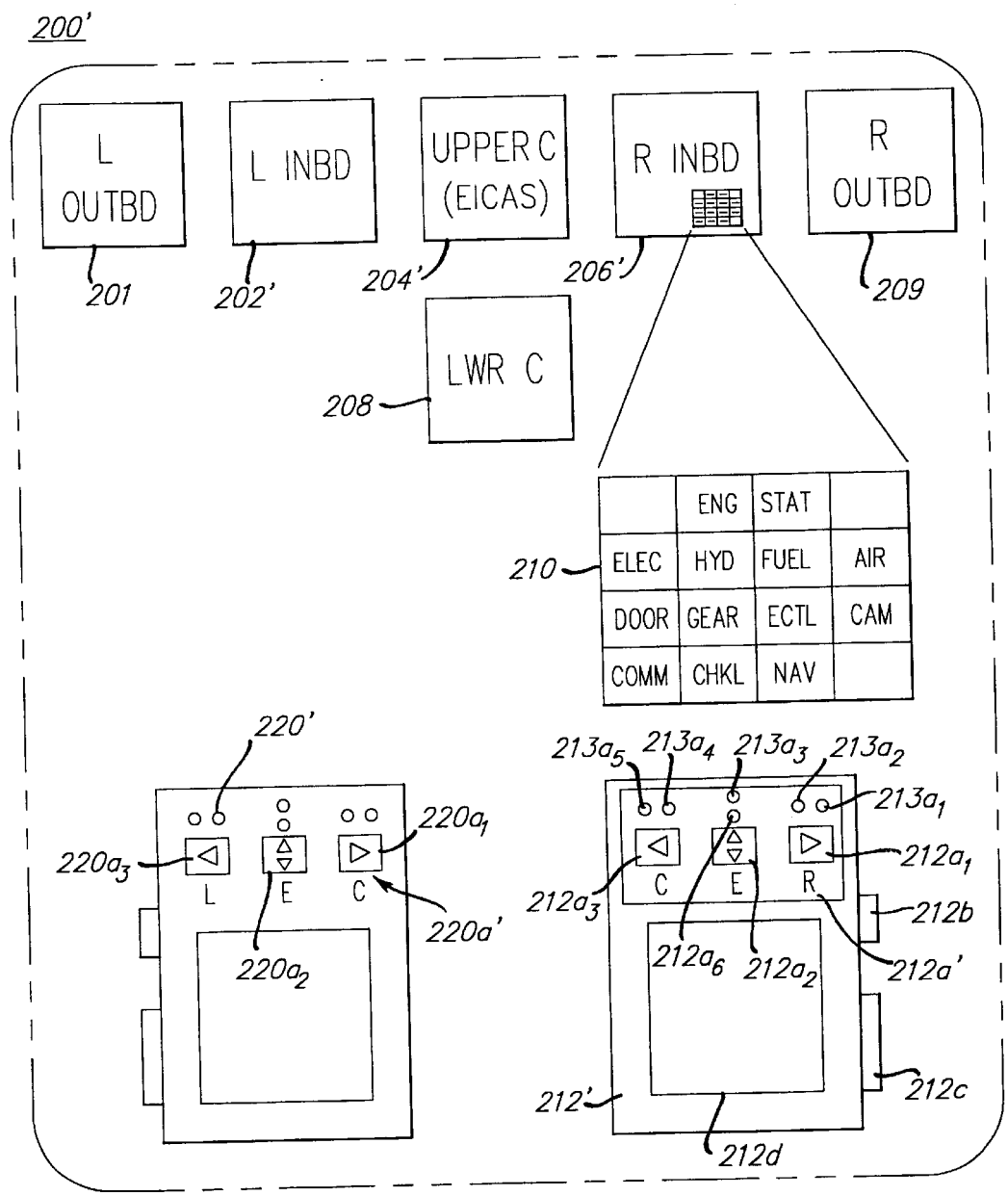
FIG. 2A is a view of an alternative embodiment of the switches used with the display system.

In an alternative embodiment 200' shown in FIG. 2A, all of the displays 201, 202', 204', 206', 208 and 209 are shared. Consequently, the CCD display select switches 212a' and 220a' of each CCD, 212', 220', respectively, may be modified. Pressing one of the switches, $212a_1$, $212a_2$ or $212a_3$ causes the cursor to jump to the next adjacent display in the direction indicated by the arrow label on the switch. Pressing a switch, $212a_1$, $212a_2$ or $212a_3$, once would jump the cursor one display in the direction indicated. Holding the switch depressed would jump the cursor from display to display to display in the direction shown in, for example, 500 millisecond steps. A circular path function is possible where holding the left or right switch depressed would cause the cursor to repeatedly cycle through all of the displays from left to right or from right to left. Similarly, holding the center switch $212a_2$ depressed could cause the cursor to repeatedly cycle back and forth between the last selected upper and the upper and lower display. Indicator lights $213a_1$–$213a_6$ correspond to displays 209, 206', 204', 202', 201 and 208, respectively, and illuminate to indicate the display that the cursor is currently on. Therefore, any of these six shared displays may be accessed by either the Left or Right cursor using the Left or Right CCD 220' or 212', respectively. It should be understood in this discussion that the Left and Right cursors are unique/separate and preferably differentiated by shape, color or some other discernable characteristic (s). The two cursors, Left and Right, are mutually exclusive—meaning that they cannot both be active on the same display. In the case where a first cursor is active on a display, and the second cursor is selected to that same display, the second cursor will "bump" or displace the first cursor from the display. The first cursor either moves to a default display or is not displayed until a display selection is made on the CCD controlling the first cursor. In certain cases/instances, both cursors may be allowed to operate on a display simultaneously. The display select switches and indications discussed, may be implemented via hardware or alternatively may be software display based indications implemented by enlarging the CCD touchscreen area forward of it's present limits.

Referring to FIG. 2, the upper center, lower center, left and right multifunction displays 204, 208, 202, and 206, respectively, are used to display any of the conventional display select panel functions, such as CHKL, COMM, NAV, FUEL, ENG, STAT, etc. Alternatively, the displays 202, 204, 206, 208 and others not shown may be used to display a dedicated function such as EICAS, NAV, PFD, etc. but provide for the concurrent display of special interactive information and control panels. The alpha numeric menu/control panel shown in FIG. 3, to be discussed momentarily, generically represents such specially created interactive functions.

Figure 3:
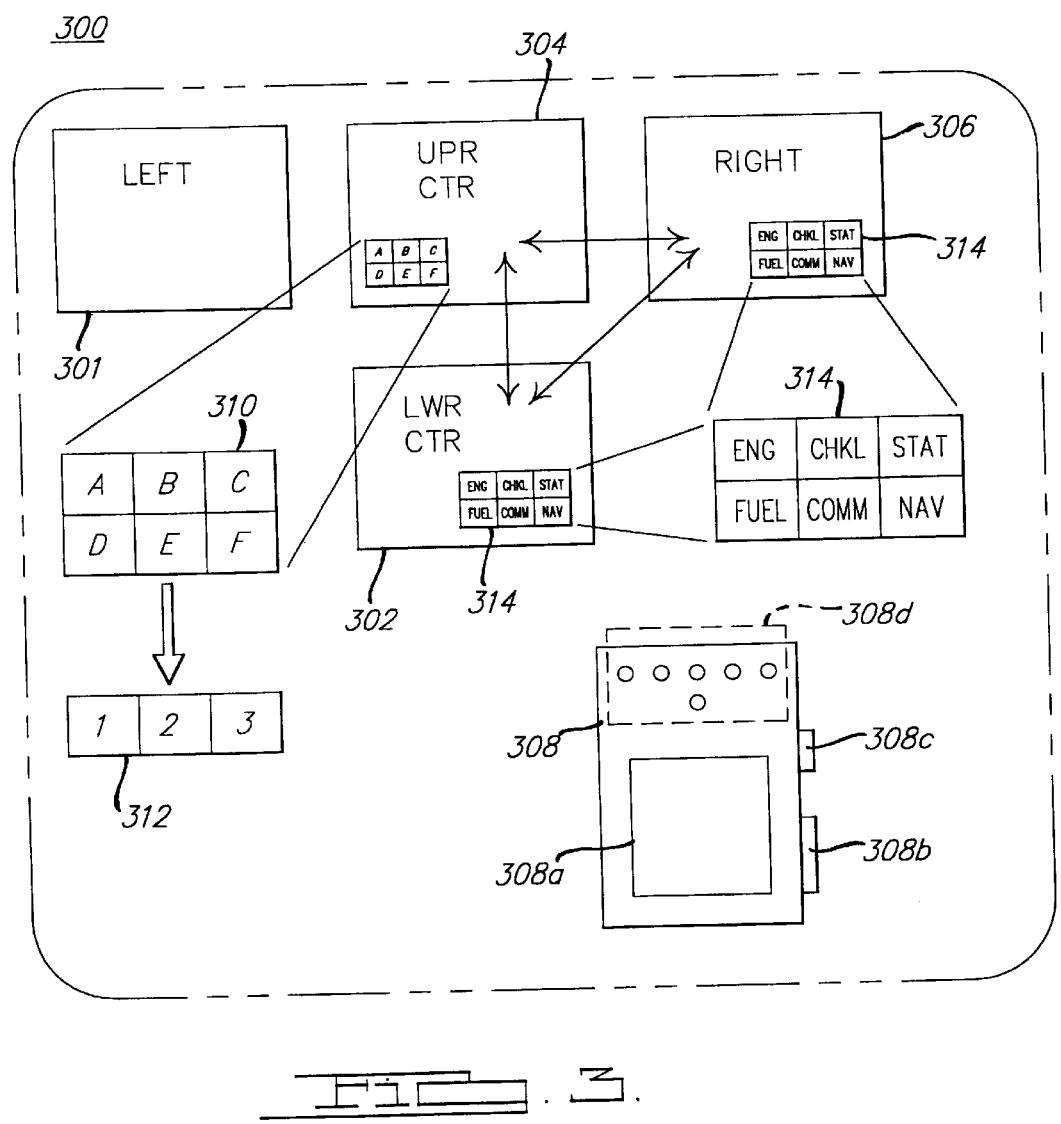
FIG. 3 is a view of an alternative preferred embodiment of the present invention.

FIG. 3 shows a system 300 in accordance with an alternative preferred embodiment of the present invention. This system 300 incorporates an upper left display 301, lower center display 302, an upper center display 304, an upper right display 306, and a right CCD 308 and an identical left CCD (not shown). Display system 300 also forms a display based cursor instantiating fully coupled display and cursor selection. The CCD 308 also includes a touch screen 308a, function select switch 308b, a menu/control panel select switch 308c and display indicator lights 308d. When the cursor is positioned on an interactive pop-up menu 314 or interactive pop-up control panel 310 comprising menu or control selections "A" through "F" to be displayed. Positioning the cursor over one of these menu or control selections and pressing the function select switch 308b displays the selected menu function, activates the selected control, or causes a second pop-up control panel or menu 312 comprising selections 1, 2 and 3 to be displayed. For the purpose of control and display management, or to eliminate the possibility of display misselections or erroneous/unintended inputs, display or format specific menus or control panels such as the generic alpha-numeric function shown are preferably designed to be displayed in specific locations on specific predesignated displays or display functions. For example, the alpha-numeric menu/control panels 310 and 314 are shown designated for display only on the upper center display, or only on the EICAS format regardless of the display location of the EICAS format. By default, since a display is selected by placing the cursor on it and a menu is displayed by pressing the menu select switch 308c or the function select switch 308b, display, function and cursor selections are fully coupled. It will be appreciated that function selection is made from an active menu 314 by a flight crew member such as a pilot on either the left display 301, upper center display 304, lower center display 302 or the right display 306. As noted, display location or format specific menus or control panels could be designated for display. Thus, the user cursor, display selection and function selection are all collocated on each single display. As a result, the potential display misselections and input errors described above are prevented. Additional displays displaying a function menu such as 314 or a display or format unique menu or control panel such as panel 310 or menu 312 could be added as desired.

With the embodiment of FIG. 3, the cursor is moved from one display to another by simply "pushing" the cursor against a display edge leading to or facing toward the desired, adjacent display. For example, by using the touch screen, the DSP and the display select buttons 212a on the CCDs 212, 220 of FIG. 2 are not needed. The cursor is displayed full time in both interactive functions (e.g., CHKL, COMM, FUEL) and in non-interactive functions (e.g., EICAS, NAV, ENG, and STAT) and on blank displays. Interactive and non-interactive functions are selected by pressing the menu select switch 308c or by placing the cursor in an inactive (unhighlighted) display area and pressing the function select switch 308b on the CCD 308. Menu 314 or some other interactive area then appears that allows selection and deselection of various interactive and non-interactive functions. Alternatively, as previously described, a display or format specific menu or control panel could then appear. Menu 314 is also illustrated in FIGS. 4 and 5.

It is noted that the non-interactive functions (e.g., NAV, ENG, STAT, and EICAS) and the lower center display, when blank, are completely inactive. Pressing the CCD function select switch 308b when the cursor is positioned over any of the items of menu 314 displays the interactive or non-interactive function selected and positions the cursor to some default position on the displayed function. Default cursor positioning is predefined and based on existing logical conditions. Alternatively, menu 314 would include selections (not shown) which when selected display a control panel or second menu (i.e., submenu) of options (not shown) that can be selected. However, with the interactive functions (e.g., CHKL, COMM, FUEL, Alpha Menu etc.), it is necessary to either press the menu select switch 308c, or move the cursor to an inactive area before pushing the CCD function select switch 308b to display the menu 310 or 314.

Figure 4:
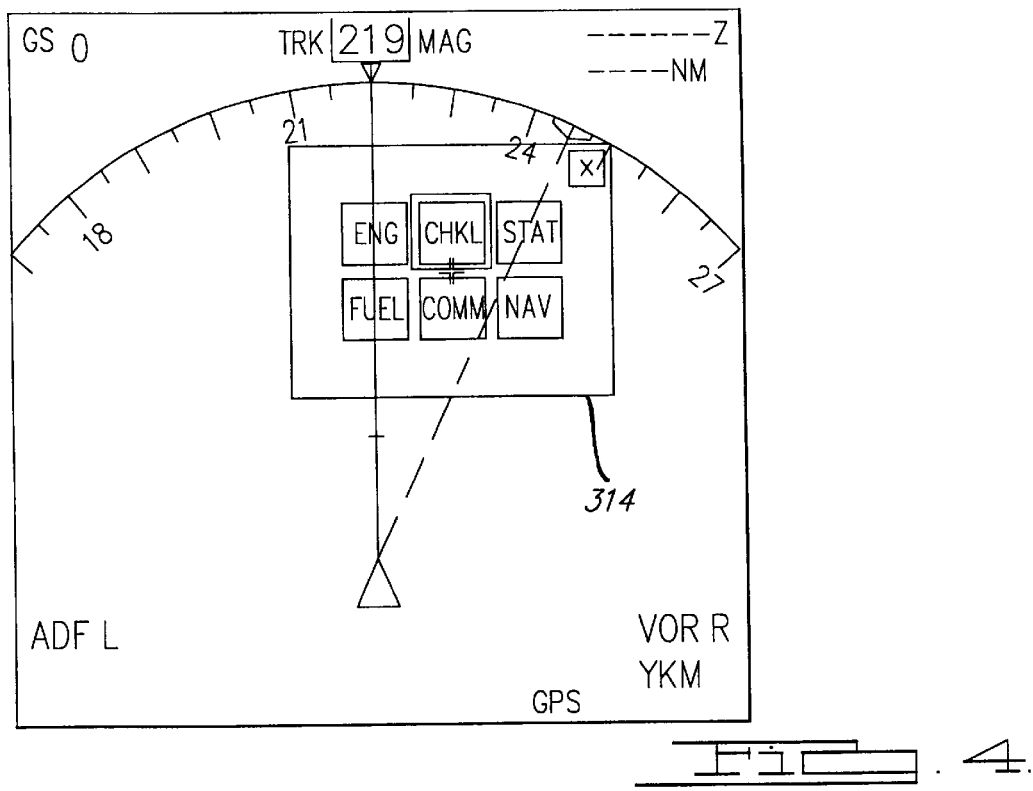
FIG. 4 is an enlarged view of the display based menu appearing on a display.
Figure 5:
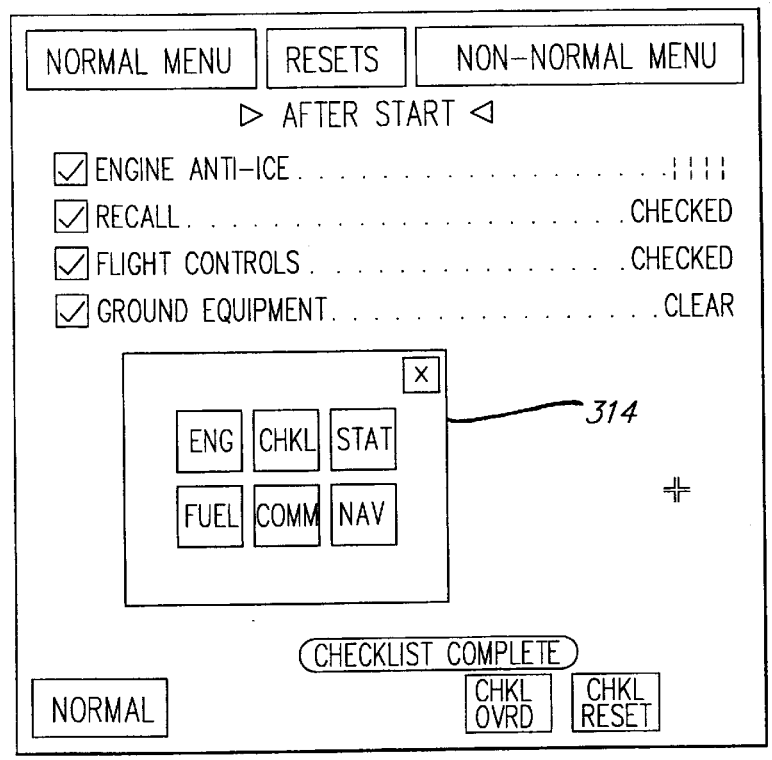
FIG. 5 is another type of display based menu.

The display based menu 314 illustrated in FIGS. 4 and 5 may or may not be restricted to the left display 301, lower center display 302 and right display 306. If restricted, as described hereinbefore, this menu and its functions could not be selected on the upper center display 304. Instead, selecting the CCD 308 function select switch 308b while the cursor is positioned in an inactive area on the upper center display 304 or selecting the menu select switch 308c would cause a display location or EICAS format specific interactive area such as the alpha menu 310 to appear as shown in FIG. 3. The alpha menu 310 selections A, B,C, D, E, and F shown are generic labels which abstractly represent displayable menu selections or control functions which, depending on the specific instantiation, may or may not lead to sub menus or control panels. The selection in this menu may represent system control switches whose state can be changed (e.g., ON or OFF, OPEN or CLOSED, AUTO or MANUAL, ON, OFF, or AUTO, etc.). As described, selecting A, B, C, D, E or F from menu 310 may cause the pop-up of sub menus or control panels. Control panel 312 illustrates a generic three switch control panel. The numbers represent abstract generic labels which would vary depending on the specific control installation. For example, the three switches might be labeled ACCEPT, REJECT, CANCEL, or might be labeled LIGHTS, LANDING, TAXI, LOGO, etc. Regardless, selecting 1, 2, or 3 (i.e., LANDING, TAXI or LOGO) would cause the selected switch to turn color or change in some visual manner sufficient to indicate that the switch has been selected or deselected (i.e., turned on or off).

The system 300, therefore, also forms a system providing fully coupled display and cursor selection. Advantageously, the user's cursor, display selection and function selection are all collocated on the desired display. As a result, the possibility of display misselections and input errors is dramatically reduced.

The foregoing discussion discloses and describes preferred embodiments of the invention. One skilled in the art will readily recognize from such discussion, and from the accompanying drawings and claims, that changes and modifications can be made to the invention without departing from the true spirit and fair scope of the invention as defined in the following claims.

What is claimed is:

1. A cursor and display management and control system for a vehicle which is capable of being used by a pair of operators to allow each said operator to independently select desired ones of a plurality of multi-function displays, said system comprising:

a plurality of multi-function displays including at least one display to be shared by both of said operators;

at least one cursor control device (CCD) assigned for use to a first one of said operators; and said CCD having a cursor positioning device for moving an associated cursor, a menu select switch, and an input/function select switch, a touch screen being operable to enable said first one of said operators to select a second one of said displays for use by said first one of said operators by positioning said cursor at a predetermined area of the first one of said displays, wherein said cursor automatically and freely moves to said second one of said displays and said cursor is active only on the second one of said displays.

2. The system of claim 1, wherein a first pop-up menu is displayed on said first one of said displays when said cursor is positioned on an inactive area of said one of said displays and said function select switch is pressed.

3. The system of claim 1, wherein a first pop-up menu is displayed on said first one of said displays when said cursor is positioned at any location on said first one of said displays and said CCD menu select switch is pressed.

4. The system of claim 1, wherein placing said cursor over an active area of said display or menu causes said active area or menu item, representing a specific function, to be visually differentiated from other active areas, and pressing said input/function select switch causes said specific function which said cursor is positioned over to be selected and visually differentiated as a selected function.

5. The system of claim 1, further comprising a plurality of display indicator lights for visually indicating which one of said displays is presently selected.

6. The system of claim 1, wherein said cursor is automatically positioned at a predetermined position on one of said displays when selected thereto.

7. A cursor and display management system comprising:
 a plurality of displays for displaying at least one of information or a plurality of functions;
 at least one cursor control device (CCD) including:
 a cursor positioning device for moving a cursor associated with said CCD around a display area of a selected one of said displays;
 a selection switch for selecting one of a plurality of available menu options displayed on said selected display; and
 wherein desired ones of said displays can be selected by an operator using said cursor positioning device by positioning said cursor of an associated CCD at a predetermined area of each of said displays, wherein said cursor of said associated CCD is caused to jump from a presently selected display to a different display such that said cursor is only active on the selected one of said displays and without subsequent manual actuation of any mechanical switch by said operator.

8. The system of claim 7, wherein once said cursor is positioned on a given one of said displays, said cursor is moveable to and from only predetermined areas within the given one of said displays.

* * * * *